US009127961B2

(12) United States Patent
Kirsch (10) Patent No.: US 9,127,961 B2
(45) Date of Patent: Sep. 8, 2015

(54) METHODS AND SYSTEMS FOR USE IN PLANNING A TRIP

(71) Applicant: David Michael Kirsch, Torrance, CA (US)

(72) Inventor: David Michael Kirsch, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 14/039,911

(22) Filed: Sep. 27, 2013

(65) Prior Publication Data

US 2014/0163863 A1  Jun. 12, 2014

Related U.S. Application Data

(60) Provisional application No. 61/734,141, filed on Dec. 6, 2012.

(51) Int. Cl.
*G01C 21/36* (2006.01)
*G01C 21/34* (2006.01)

(52) U.S. Cl.
CPC ............ *G01C 21/3679* (2013.01); *G01C 21/34* (2013.01)

(58) Field of Classification Search
CPC ............................. G01C 21/3679; G01C 21/34
USPC .......................................................... 701/400
See application file for complete search history.

(56) References Cited

U.S. PATENT DOCUMENTS

| | | | |
|---|---|---|---|
| 5,559,707 A | 9/1996 | DeLorme et al. | |
| 5,802,492 A | 9/1998 | DeLorme et al. | |
| 5,848,373 A | 12/1998 | DeLorme et al. | |
| 5,948,040 A | 9/1999 | DeLorme et al. | |
| 6,321,158 B1 | 11/2001 | DeLorme et al. | |
| 6,526,351 B2 | 2/2003 | Whitham | |
| 7,082,365 B2 | 7/2006 | Sheha et al. | |
| 7,321,826 B2 | 1/2008 | Sheha et al. | |
| 8,014,939 B2 | 9/2011 | Sheha et al. | |
| 8,208,941 B2 * | 6/2012 | Holm et al. | ................ 455/456.1 |
| 8,301,371 B2 | 10/2012 | Sheha et al. | |
| 8,566,029 B1 * | 10/2013 | Lopatenko et al. | ........... 701/426 |
| 8,669,884 B2 * | 3/2014 | Beyeler et al. | ............. 340/995.1 |
| 8,681,022 B2 * | 3/2014 | Beyeler et al. | ................ 340/991 |
| 8,724,792 B2 * | 5/2014 | Yakman et al. | ........... 379/220.01 |
| 8,781,716 B1 * | 7/2014 | Wenneman et al. | .......... 701/118 |
| 8,810,437 B2 * | 8/2014 | Beyeler et al. | ............. 340/995.1 |
| 8,909,476 B2 * | 12/2014 | Tuukkanen | ................... 701/538 |
| 8,930,135 B2 * | 1/2015 | Ettinger | .......................... 701/450 |
| 2005/0165543 A1 * | 7/2005 | Yokota | ........................ 701/204 |
| 2008/0048890 A1 * | 2/2008 | Sheha et al. | ................ 340/995.1 |
| 2010/0070165 A1 * | 3/2010 | Kang | ............................ 701/201 |
| 2010/0161215 A1 * | 6/2010 | Karani | .......................... 701/204 |

(Continued)

FOREIGN PATENT DOCUMENTS

JP         2011154004 A    *   8/2011

*Primary Examiner* — Tuan C. To
(74) *Attorney, Agent, or Firm* — Armstrong Teasdale LLP (57) ABSTRACT

A projected route between a first location and a second location is determined. A first point-of-interest associated with a third location proximate to the projected route is determined. The first point-of-interest is presented to a user. Additionally or alternatively, a plurality of locations are identified. Each location of the plurality of locations is associated with a respective time. A point-of-interest is received from a user. The point-of-interest is associated with a point-of-interest location. A projected route including the plurality of locations and the point-of-interest location is determined based at least in part on at least one time associated with the plurality of locations.

18 Claims, 7 Drawing Sheets

(56) References Cited

U.S. PATENT DOCUMENTS

| | | |
|---|---|---|
| 2011/0231091 A1* | 9/2011 | Gourlay et al. .............. 701/204 |
| 2011/0238301 A1* | 9/2011 | Lee .............................. 701/207 |
| 2012/0011137 A1 | 1/2012 | Sheha et al. |
| 2012/0203460 A1* | 8/2012 | Cho et al. ..................... 701/538 |
| 2012/0259541 A1* | 10/2012 | Downey et al. ............... 701/433 |
| 2013/0035852 A1* | 2/2013 | Vandivier et al. ............. 701/426 |
| 2013/0046465 A1* | 2/2013 | Serbanescu et al. .......... 701/527 |
| 2014/0074401 A1* | 3/2014 | Otani ............................ 701/533 |
| 2014/0155092 A1* | 6/2014 | Ben-Dayan et al. ....... 455/456.2 |
| 2014/0156410 A1* | 6/2014 | Wuersch et al. ........... 705/14.58 |
| 2015/0066649 A1* | 3/2015 | Kumar et al. .............. 705/14.64 |

\* cited by examiner

METHODS AND SYSTEMS FOR USE IN PLANNING A TRIP

CROSS REFERENCE TO RELATED APPLICATIONS

This application claims priority to U.S. Provisional Patent Application No. 61/734,141 filed Dec. 6, 2012, which is hereby incorporated by reference in its entirety.

BACKGROUND

The present disclosure relates generally to mobile devices and, more particularly, to methods and systems for use in planning a trip.

Some known mobile device applications identify local points-of-interest including, without limitation, architectural sites, historic sites, recreational sites, restaurants, museums, and tourist sites. At least some such applications, however, do not integrate and/or consider user-related constraints when presenting the points-of-interest to a user.

BRIEF SUMMARY

In one aspect, a computer-implemented method is provided for planning a trip. The method includes determining a projected route between a first location and a second location, determining a first point-of-interest associated with a third location proximate to the projected route, and presenting the first point-of-interest to a user.

In yet another aspect, computer-readable storage media is provided having computer-executable instructions embodied thereon. When executed by at least one processor, the computer-executable instructions cause the processor to determine a projected route between a first location and a second location, determine a first point-of-interest associated with a third location proximate to the projected route, and present the first point-of-interest to a user.

In yet another aspect, a computer-implemented method is provided for planning a trip. The method includes identifying a plurality of locations. Each location of the plurality of locations is associated with a respective time. A point-of-interest is received from a user. The point-of-interest is associated with a point-of-interest location. A projected route including the plurality of locations and the point-of-interest location is determined based at least in part on at least one time associated with the plurality of locations.

In yet another aspect, computer-readable storage media is provided having computer-executable instructions embodied thereon. When executed by at least one processor, the computer-executable instructions cause the processor to receive a point-of-interest from a user, and determine a projected route including a plurality of locations and the point-of-interest location based at least in part on at least one time associated with the plurality of locations. The point-of-interest is associated with a point-of-interest location. Each location of the plurality of locations is associated with a respective time.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to mobile devices and, more particularly, to methods and systems for use in planning a trip. In one embodiment, a current location associated with a user is identified, and a destination is received from the user. A projected route is determined based on the current location and the destination, and at least one point-of-interest along the projected route is determined for presentation to the user. Additionally or alternatively, a plurality of events associated with a user are identified. A first event is received from the user, and the first event is scheduled based on a current location of the user, a projected travel time and duration associated with the first event, and a projected route associated with the current location and the plurality of events.

Accordingly, embodiments of the methods and systems described herein enable a computing system to (i) identify a current location associated with a user; (ii) receive a destination from the user; (iii) determine a projected route based on the current location and the destination; (iv) determine at least one point-of-interest along the projected route for presentation to the user; (v) identify a plurality of events associated with a user; (vi) receive a first event from the user; and (vii) scheduling the first event based on a current location of the user, a projected travel time and duration associated with the first event, and a projected route associated with the current location and the plurality of events.

As used herein, an element or step recited in the singular and proceeded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

Figure 1:
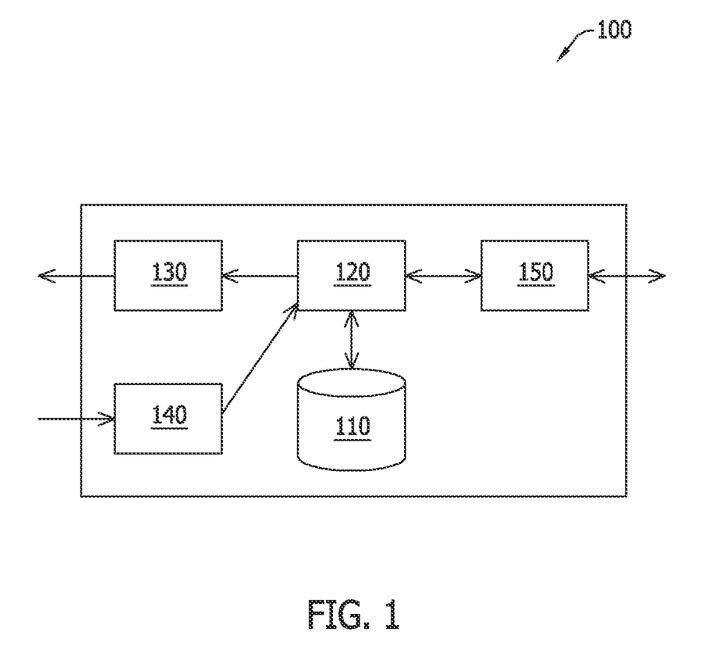
FIG. 1 is a schematic illustration of an exemplary computing system for planning a trip in accordance with one aspect of the present disclosure.

FIG. 1 is a schematic illustration of an exemplary computing system 100 for use in planning a trip. As used herein, the term "trip" refers to any act of travelling from one location to another. In the exemplary embodiment, computing system 100 is a mobile device, such as a smartphone, tablet, a car dashboard, and the like. Alternatively, computing system 100 may be any device that enables computing system 100 to function as described herein. For example, in at least some embodiments, computing system 100 may be a desktop or laptop computer. In the exemplary embodiment, computing system 100 includes a memory device 110 and a processor 120 coupled to memory device 110 for use in executing instructions. More specifically, computing system 100 is configurable to perform one or more operations described herein by encoding an operation as one or more executable instructions, storing the executable instructions in memory device 110, and executing the stored executable instructions using processor 120.

Processor 120 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the exemplary embodiment, memory device 110 includes one or more devices (not shown) that enable information such as executable instructions and/or other data to be selectively stored and retrieved. In the exemplary embodiment, such data may include, but is not limited to, location data, calendar data, operational data, and/or control algorithms. Alternatively, computing system 100 may be configured to use any algorithm and/or method that enable the methods and systems to function as described herein. Memory device 110 may also include one or more computer readable media, such as, without limitation, dynamic random access memory (DRAM), static random access memory (SRAM), a solid state disk, and/or a hard disk.

In the exemplary embodiment, computing system 100 includes a presentation interface 130 that is coupled to processor 120 for use in presenting information to a user. For example, presentation interface 130 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 130 includes one or more display devices.

Computing system 100, in the exemplary embodiment, includes an input interface 140 for receiving input from the user. For example, in the exemplary embodiment, input interface 140 receives information suitable for use with the methods described herein. Input interface 140 is coupled to processor 120 and may include, for example, a camera, a microphone, a joystick, a keyboard, a pointing device, a mouse, a stylus, a touch sensitive panel (e.g., a touch pad or a touch screen), a position and/or motion detector, and/or a sound detector. It should be noted that a single component, for example, a touch screen, may function as both presentation interface 130 and as input interface 140.

In the exemplary embodiment, computing system 100 includes at least one communication interface 150 that is coupled to processor 120. In the exemplary embodiment, communication interface 150 communicates with at least one remote device, such as another computing system 100. For example, in one embodiment, communication interface 150 is a global positioning system (GPS) receiver module configured to provide additional navigation- and location-related wireless data to computing system 100. Communication interface 150 may use, without limitation, a wired network adapter, a wireless network adapter, and/or a mobile telecommunications adapter. A network (not shown) used to couple computing system 100 to the remote device may include, without limitation, the Internet, a local area network (LAN), a wide area network (WAN), a wireless LAN (WLAN), a mesh network, and/or a virtual private network (VPN) or other suitable communication means.

Figure 2:
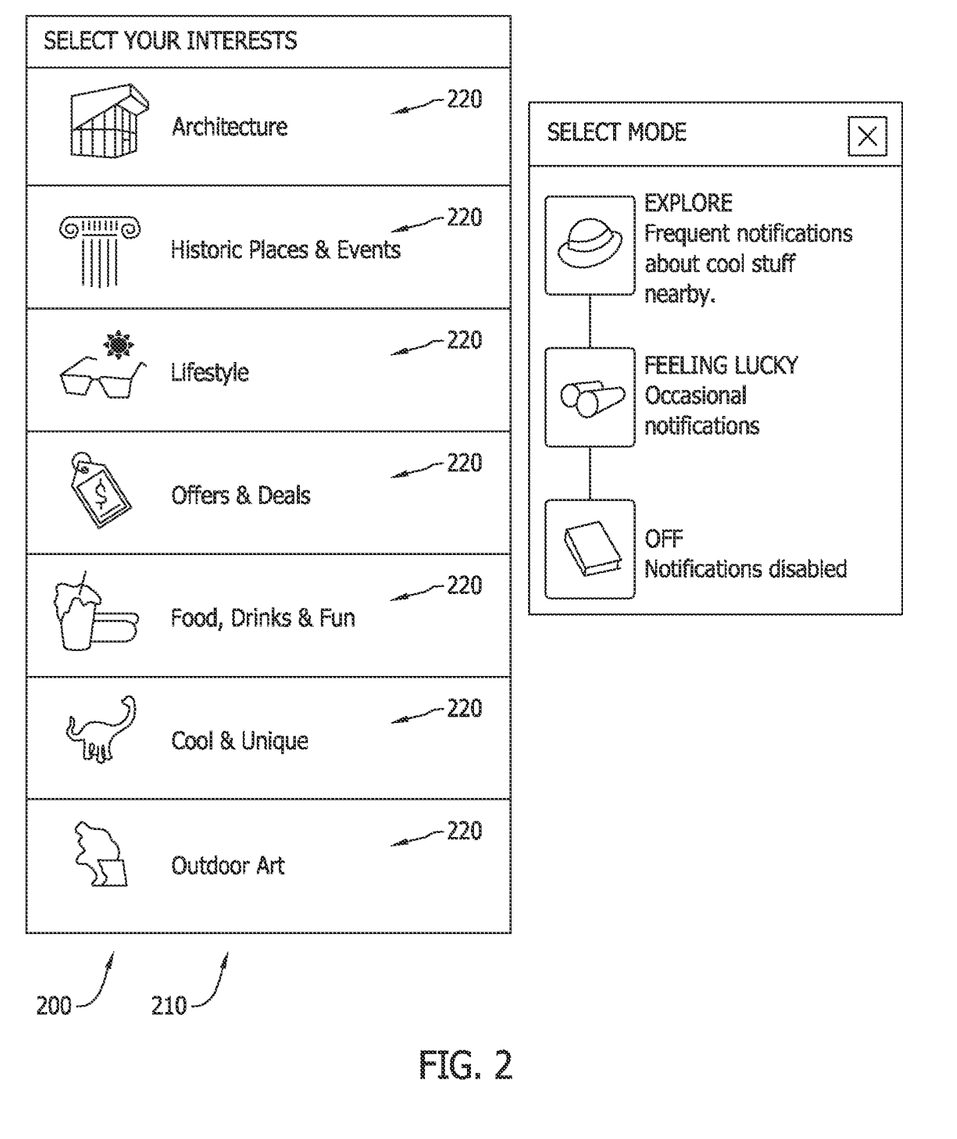
FIG. 2 is an exemplary screenshot of a home screen that may be shown using the computing system shown in FIG. 1 in accordance with one aspect of the present disclosure.

FIG. 2 is an exemplary screenshot 200 of a home screen 210 presented on presentation interface 130 (shown in FIG. 1). Home screen 210 includes a plurality of category buttons or links 220 that are each associated with a respective user interest. For example, in the exemplary embodiment, the user interests include "Architecture", "Historic Places & Events", "Lifestyle", "Offers & Deals", "Food, Drinks & Fun", "Cool & Unique", and "Outdoor Art". Alternatively, a link 220 may be associated with any user interest that enables computing system 100 to function as described herein.

In the exemplary embodiment, in response to a selection of a first link 220 (e.g., "Architecture"), presentation interface 130 presents a plurality of points-of-interest (POI) (not shown) that are associated with the user interest associated with first link 220 and proximate to a first location (e.g., a current location), a second location (e.g., a projected location), and/or a third location therebetween (e.g, along a projected route between the first location and the second location). POIs may include locations (e.g., current location, destination, architectural sites, historic sites, recreational sites, restaurants, museums, tourist sites, and the like) and/or events (e.g., shows, concerts, tours, excursions, conventions, and the like). Alternatively, POIs may be associated with any location along a projected route that enables computing system 100 to function as described herein.

In the exemplary embodiment, computing system 100 is configured to determine POIs for presentation to a user based on parameters including, but not limited to, user preferences (e.g., categories, price ranges, route preferences, previously-selected POIs), popular or trending POIs (e.g., POIs presented or selected to another user at a similar location as the user location and/or having similar preferences to the user preferences), a current location, a projected location (e.g., a destination), a projected route between the current location and the projected location, a current time associated with the current location, a projected time associated with the projected location, a home location of the user, and/or previously-scheduled locations or POIs. Accordingly, computing system 100 is configured to plan a trip for the user and/or integrate POIs along current and projected routes, times, and/or locations.

In at least some embodiments, the user preferences may also include a notification frequency. For example, the user may select one of a plurality of notification frequencies to selectively increase and/or decrease a frequency of POI notifications. In one implementation, in a first mode (e.g., "Explore"), presentation interface 130 presents at least one alert notification associated with at least one POI to the user relatively frequently. In a second mode (e.g., "Feeling Lucky"), presentation interface 130 presents at least one alert notification associated with at least one POI to the user relatively occasionally (i.e., less frequently than when in the first mode). In a third mode (e.g., "Off"), presentation interface 130 does not present any alert notifications associated with a POI to the user. Alternatively, POI notifications may be presented at any frequency that enables computing system 100 to function as described herein.

Figure 3:
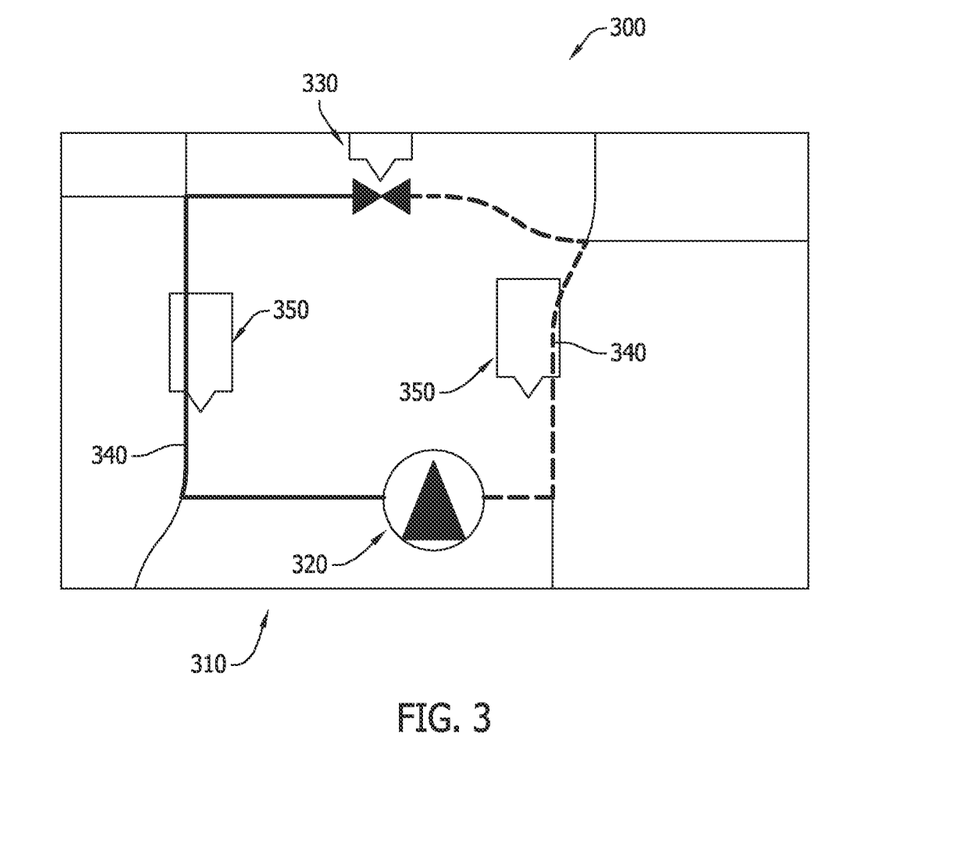
FIG. 3 is an exemplary screenshot of a map view that may be shown using the computing system shown in FIG. 1 in accordance with one aspect of the present disclosure.

FIG. 3 is an exemplary screenshot 300 of a map view 310 presented on presentation interface 130 (shown in FIG. 1). Map view 310 includes a first location 320 (e.g., a current location), a second location 330 (e.g., a projected location), at least one projected route 340 between first location 320 and second location 330, and at least one POI 350 associated with a third location along and/or proximate to first location 320, second location 330, and/or projected route 340.

In the exemplary embodiment, computing system 100 is configured to identify and/or determine first location 320 and second location 330. For example, in one implementation, first location 320 is determined based on a current position of a user, and a second location 330 is determined based on user input. In the exemplary embodiment, at least one projected route 340 between first location 320 and second location 330 is calculated and/or determined based on parameters including, but not limited to, first location 320, second location 330, and user preferences including, without limitation, shortest route, fastest route, avoid highways, avoid toll roads, avoid ferries, and the like. Alternatively, first location 320, second location 330, and/or projected route 340 may be identified and/or determined using any mechanism and/or algorithm that enables computing system 100 to function as described herein.

In the exemplary embodiment, computing system 100 determines at least one POI 350 at a third location along and/or proximate to projected route 340 based on parameters including, but not limited to, a time associated with POI 350 (e.g., travel time to and from POI 350, time of stay or duration at POI 350, start or opening time associated with POI 350, end or closing time associated with POI 350), a projected arrival time at each POI 350, and/or a projected arrival time at second location 330. For example, in one implementation, when a time of travel along projected route 340 is approximately two hours, and a projected arrival time at second location 330 is in approximately three hours, computing system 100 determines and/or identifies POIs 350 that are associated with a time that is less than or equal to approximately one hour, such that the user may satisfy the projected arrival time at second location 330 in approximately three hours.

In the exemplary embodiment, computing system 100 determines at least one POI 350 at a second location 330 based on parameters including, but not limited to, a time associated with POI 350, a projected arrival time at each POI 350, and/or a projected arrival time at second location 330. In one implementation, when a time of travel along projected route 340 is approximately two hours, a time associated with POI 350 is approximately one hour, and a duration at second location 330 is approximately two hours, computing system 100 determines and/or identifies at least one POI 350 at second location 330 that is available in approximately three to five hours, such that the POI 350 is available while the user is projected to be at second location 330.

In the exemplary embodiment, projected route 340 and POIs 350 are iteratively calculated and/or determined each time a new POI 350 is selected. That is, when a first POI 350 is selected, in the exemplary embodiment, computing system 100 determines a new projected route 340 and may determine additional POIs 350 based on at least partially on the new projected route 340 including the first POI 350.

Figure 4:
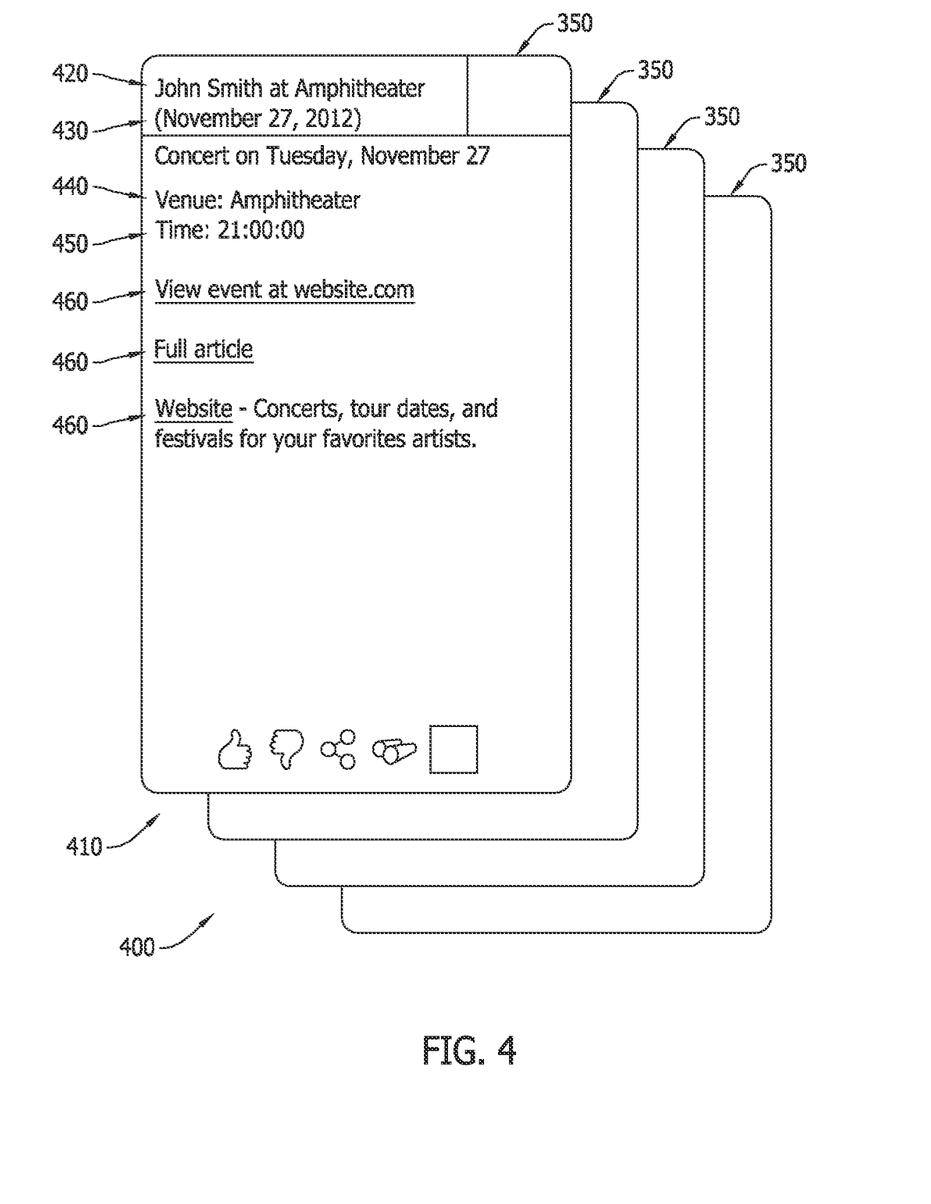
FIG. 4 is an exemplary screenshot of a point-of-interest view that may be shown using the computing system shown in FIG. 1 in accordance with one aspect of the present disclosure.

FIG. 4 is an exemplary screenshot 400 of a POI view 410 presented on presentation interface 130 (shown in FIG. 1). POI view 410 includes a plurality of POIs 350 in a narrative or description format. In the exemplary embodiment, each POI 350 includes information associated with POI 350 including, without limitation, a name 420, a date 430, a venue 440, a time 450, and links 460 to additional information. For example, in the exemplary embodiment, POI view 410 includes four POIs 350 that are in a cascade arrangement that enables a user to selectively navigate through the presented POIs 350. Alternatively, POIs 350 may be arranged in any format that enables POI view 410 to function as described herein.

In the exemplary embodiment, POIs 350 include a first POI that is associated with a first location (e.g., a current location) and a first time (e.g., a current time), a second POI that is associated with a second location (e.g., a destination) and a second time (e.g., a projected time of arrival and/or duration at the destination), and/or a third POI that is associated with a third location (e.g., a location along a projected route) and a third time (e.g., a projected time of arrival and/or duration at the location along the projected route). In the exemplary embodiment, the first time, the second time, and/or the third time are determined based at least in part on the projected route including, without limitation, a current time, a desired time of arrival and/or duration at the destination, a desired time of arrival and/or duration at the location along the projected route, a projected time of travel between any combination of the first location, the second location, and the third location, a projected amount of time at any combination of the first location, the second location, and the third location, and/or user preferences including, without limitation, shortest route, fastest route, avoid highways, avoid toll roads, avoid ferries, and the like. Alternatively, the first time, the second time, and/or the third time may be determined using any factor that enables computing system 100 to function as described herein.

Figure 5:
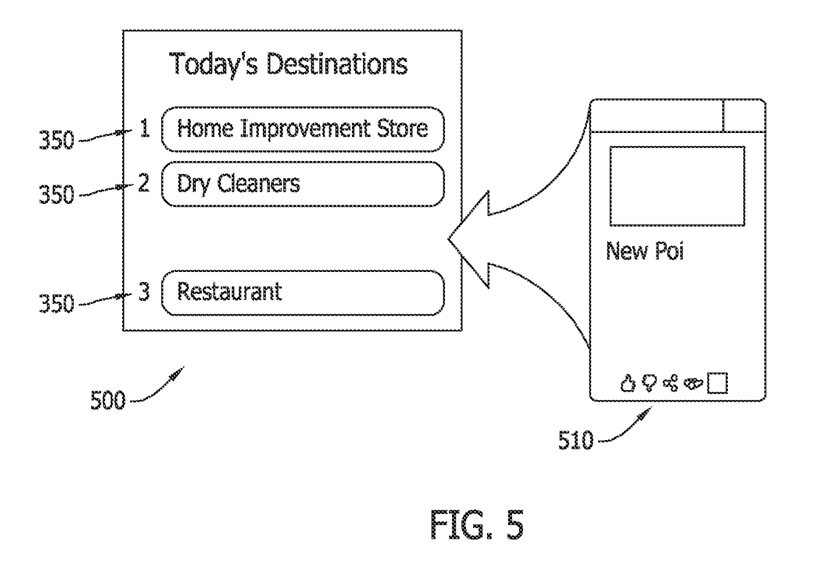
FIG. 5 is a schematic illustration of a calendar or scheduler that may be shown using the computing system shown in FIG. 1 in accordance with one aspect of the present disclosure.

FIG. 5 is a schematic illustration of a calendar or scheduler 500 that may be presented on presentation interface 130 (shown in FIG. 1). In the exemplary embodiment, scheduler 500 includes a plurality of scheduled events (or, more broadly, POIs) 350 associated with a user. Each POI is associated with a respective location and a time (e.g., a projected time of arrival and/or duration at the location). The projected time of arrival and/or duration may be determined based at least in part on the projected route including, without limitation, a current time, a desired time of arrival and/or duration at the destination, a desired time of arrival and/or duration at a location along the projected route, a projected time of travel between any combination of the first location, the second location, and the third location, a projected amount of time at any combination of the first location, the second location, and the third location, and/or user preferences including, without limitation, shortest route, fastest route, avoid highways, avoid toll roads, avoid ferries, and the like. Alternatively, the projected time of arrival and/or duration may be determined using any factor that enables computing system 100 to function as described herein.

In the exemplary embodiment, computing system 100 is configured to receive a first POI 510 from a user, and determine where and/or when first POI 510 will be scheduled based on parameters including, but not limited to, a current location of the user, a projected travel time and duration associated with first POI 510, and a projected route, POIs 350, and user preferences, such that first POI 510 is integrated into the user's schedule. For example, in the exemplary embodiment, the projected route is determined based at least in part on a first time (travel and/or duration) associated with the first location, a second time (travel and/or duration) associated with the second location, a third time (travel and/or duration) associated with the third location, and/or a fourth time (travel and/or duration) associated with POI 350.

In one implementation, the sequence or order of the first location, the second location, and/or the third location is fixed relative to each other. In such an implementation, the fourth location is inserted in the projected route between two of the first location, the second location, and the third location. In another implementation, the sequence or order of the first location, the second location, and/or the third location is variable. In such an implementation, the first location, the second location, the third location, and the fourth location may be arranged in any order that enables computing system 100 to function as described herein.

Figure 6:
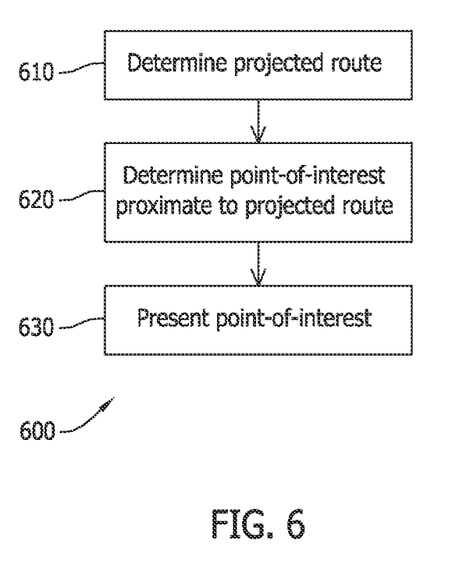
FIG. 6 is a flowchart of an exemplary method that may be implemented by the computing system shown in FIG. 1 in accordance with one aspect of the present disclosure.

FIG. 6 is a method 600 that may be implemented by computing system 100 (shown in FIG. 1) to enable a user to plan a trip. In the exemplary embodiment, a projected route between a first location and a second location is determined 610. In the exemplary embodiment, a first point-of-interest associated with a third location proximate to the projected route is determined 620 and is presented 630 to the user. In at least some implementations, the first point-of-interest is determined 620 based at least in part on a user interest associated with the user, and is presented 630 to the user based at least in part on a notification frequency.

Figure 7:
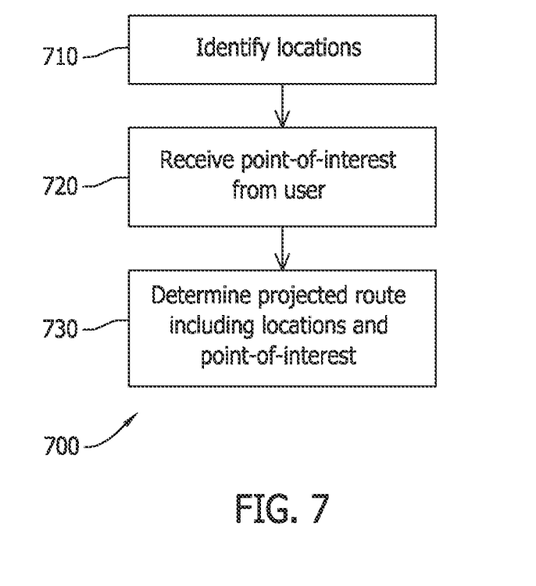
FIG. 7 is a flowchart of an exemplary method that may be implemented by the computing system shown in FIG. 1 in accordance with one aspect of the present disclosure.

FIG. 7 is another method 700 that may be implemented by computing system 100 (shown in FIG. 1) to enable a user to plan a trip. In the exemplary embodiment, a plurality of locations that are each associated with a respective time are identified 710. For example, in one implementation, a first location associated with a first time, a second location associated with a second time, and a third location associated with a third time are identified 710. A point-of-interest associated with a POI location is received 720 from the user. A projected route including the plurality of locations and the POI location is determined 730 based on a time associated with each location (e.g., a first time associated with the first location, a second time associated with the second location, a third time associated with the third location, and/or a fourth time associated with the POI location). The time may be a projected time of travel between any combination of the plurality of locations and the POI location and/or a projected time of stay or duration at any combination of the plurality of locations and the POI location. For example, in one implementation, the projected route may be determined 730, such that each of the locations and/or POI location is available when the user is projected to be at the associated location.

The embodiments described herein relate generally to mobile devices and, more particularly, to methods and systems for use in planning a trip. The embodiments described herein enable a user to plan a trip for a desired destination, explore points-of-interest along the route to the desired destination, schedule points-of-interest based on parameters including, but not limited to, projected routes, times, and/or locations, see events and/or points-of-interest in a local area, destination area, or any area in between, and arrange to schedule the points-of-interest within parameters.

The methods and systems described herein may be implemented using computer programming or engineering techniques including computer software, firmware, hardware or any combination or subset thereof, wherein the technical effects may include at least one of: a) determining a projected route between a first location and a second location; b) identifying a time associated with the second location; c) identifying a user interest associated with the user; d) identifying a notification frequency; e) determining a first point-of-interest; and f) presenting the first point-of-interest to a user.

Exemplary embodiments of methods and systems for use in planning a trip are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for planning a trip, said method comprising:
    determining a projected route between a first location and a second location;
    determining a first point-of-interest associated with a third location proximate to the projected route, wherein the first point-of-interest is determined based at least in part on the projected route between the first location and the second location;
    presenting the first point-of-interest to a user;
    identifying a time associated with the second location;
    determining a second point-of-interest associated with the second location based at least in part on the time associated with the second location; and
    presenting the second point-of-interest to the user.

2. The computer-implemented method of claim 1 further comprising identifying a user interest associated with the user, wherein the first point-of-interest is determined based at least in part on the user interest.

3. The computer-implemented method of claim 1 further comprising identifying a notification frequency, wherein the first point-of-interest is presented to the user based at least in part on the notification frequency.

4. The computer-implemented method of claim 1, wherein the time associated with the second location is a first time, the method further comprising identifying a second time associated with the second location, wherein the first point-of-interest is determined based at least in part on the second time associated with the second location.

5. A computer-readable storage media having computer-executable instructions embodied thereon, wherein, when executed by a processor, the computer-executable instructions cause the processor to:
    determine a projected route between a first location and a second location;
    determine a first point-of-interest associated with a third location proximate to the projected route, wherein the first point-of-interest is determined based at least in part on the projected route between the first location and the second location;
    present the first point-of-interest to a user;
    identify a time associated with the second location;
    determine a second point-of-interest associated with the second location based at least in part on the time associated with the second location; and
    present the second point-of-interest to the user.

6. The computer-readable storage media of claim 5, wherein the computer-executable instructions cause the processor to determine the first point-of-interest based at least in part on a user interest associated with the user.

7. The computer-readable storage media of claim 6, wherein the computer-executable instructions cause the processor to present the first point-of-interest based at least in part on a notification frequency.

8. The computer-readable storage media of claim 5, wherein the time associated with the second location is a first time, wherein the computer-executable instructions cause the processor to determine the first point-of-interest based at least in part on a second time associated with the second location.

9. A computer-implemented method for planning a trip, said method comprising:
   identifying a plurality of locations, wherein each location of the plurality of locations is associated with a respective time;
   receiving a point-of-interest from a user, wherein the point-of-interest is associated with a point-of-interest location; and
   determining a projected route such that the projected route includes each location of the plurality of locations and the point-of-interest location, wherein the projected route is determined based at least in part on at least one time associated with the plurality of locations.

10. The computer-implemented method of claim 9 further comprising determining a projected time of travel associated with each location of the plurality of locations and the point-of-interest location.

11. The computer-implemented method of claim 9 further comprising determining a first projected duration associated with each location of the plurality of locations.

12. The computer-implemented method of claim 9, wherein determining a projected route includes inserting the point-of-interest location in the projected route between adjacent locations of the plurality of locations.

13. The computer-implemented method of claim 9, wherein determining a projected route includes arranging the plurality of locations and the point-of-interest location.

14. A computer-readable storage media having computer-executable instructions embodied thereon, wherein, when executed by a processor, the computer-executable instructions cause the processor to:
   identify a plurality of locations, wherein each location of the plurality of locations is associated with a respective time;
   receive a point-of-interest from a user, wherein the point-of-interest is associated with a point-of-interest location; and
   determine a projected route such that the projected route includes each location of the plurality of locations and the point-of-interest location, wherein the projected route is determined based at least in part on at least one time associated with the plurality of locations.

15. The computer-readable storage media of claim 14, wherein the computer-executable instructions cause the processor to determine a projected time of travel associated with each location of the plurality of locations and the point-of-interest location.

16. The computer-readable storage media of claim 14, wherein the computer-executable instructions cause the processor to determine a first projected duration associated with each location of the plurality of locations.

17. The computer-readable storage media of claim 14, wherein the computer-executable instructions cause the processor to insert the point-of-interest location in the projected route between adjacent locations of the plurality of locations.

18. The computer-readable storage media of claim 14, wherein the computer-executable instructions cause the processor to arrange the plurality of locations and the point-of-interest location.

* * * * *